March 7, 1933.  E. W. BRANDT  1,900,790
GRENADE
Filed July 18, 1931   6 Sheets-Sheet 1

Inventor:
Edgar W. Brandt,
By
Attorneys.

March 7, 1933.  E. W. BRANDT  1,900,790
GRENADE
Filed July 18, 1931    6 Sheets-Sheet 4

March 7, 1933. E. W. BRANDT 1,900,790
GRENADE
Filed July 18, 1931 6 Sheets-Sheet 5

Inventor:
Edgar W. Brandt,
By
Attorneys.

March 7, 1933.  E. W. BRANDT  1,900,790
GRENADE
Filed July 18, 1931     6 Sheets-Sheet 6

Inventor:
Edgar W. Brandt,
By
Attorneys.

Patented Mar. 7, 1933

1,900,790

UNITED STATES PATENT OFFICE

EDGAR WILLIAM BRANDT, OF PARIS, FRANCE

GRENADE

Application filed July 18, 1931, Serial No. 551,744, and in France July 25, 1930.

The present invention has for object improvements in grenades and, more particularly, relates to a projectile of this type which may be fired by aid of any mechanism such as a firearm or a pneumatic gun, but is particularly well suited for firing from a rifle.

This grenade permits attaining, with the same weight and propulsive force, of an appreciably longer trajectory than those attained with the projectiles of the same type which are now in use.

It is especially remarkable in that it is constructed and arranged in such manner as to recover, for its propulsion, the kinetic energy of the rifle ball or in general of the gun employed for firing it.

The invention likewise shows an especially sensitive fuse mounted on the said grenade, the fuse comprising particularly a safety mechanism which is automatically withdrawn at the time of firing, under the effect of the shock of the bullet, which permits providing a very strong latching or lock for obtaining an absolute safety, since no shock of the same order or degree can be produced in the course of transportation and manipulation.

The invention concerns, further, a firing sleeve which can be mounted on the barrel of the firearm and whose active length may be regulated as desired for varying the trajectory.

It also has for object various methods of construction of the grenade which permit using it as a message carrying projectile, a smoke bomb, incendiary bomb, and signal bomb.

Figure 1:
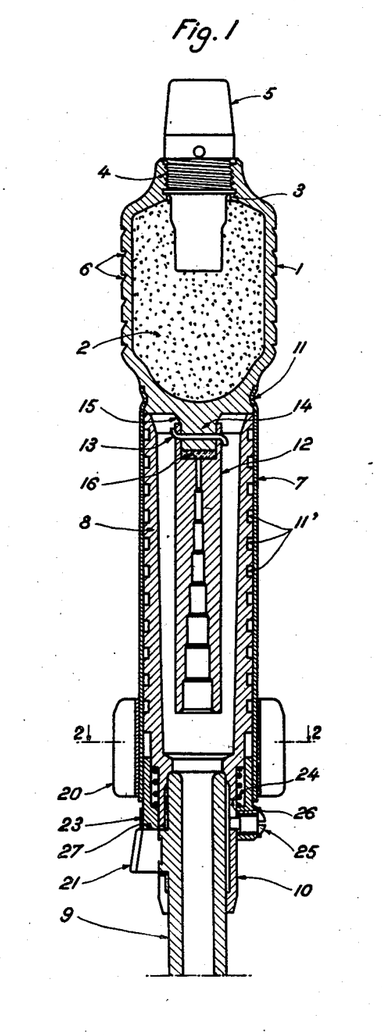
Fig. 1 is an axial section of a grenade according to this invention, in the position for firing on its sleeve, which is fastened on a rifle barrel.
Figure 2:
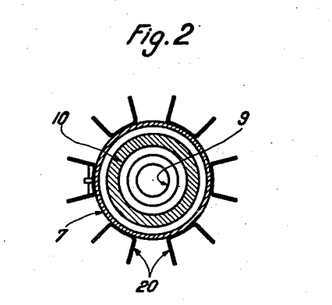
Fig. 2 is a transverse section on line 2—2 of Fig. 1.

According to the example of execution represented in Fig. 1, the grenade comprises essentially a hollow body 1 enclosing the charge 2. This body is provided with an eye in which may be fastened, by the threads 4 or otherwise, a fuse 5.

It will be understood that the grenade charge may be of any type and constituted by an explosive, smoke producing, signalling, or other type of material.

Grooves 6 or other cavities, formed in the walls of body 1, facilitate fragmentation.

At the rear of the body 1 is rigidly seated the propelling tube 7. The fixing of tube 7 on the body may take place by crimping or rolling at 11, as shown in Fig. 1, or by soldering, by welding, by riveting, by aid of a threaded or other joint, or in any other manner. The tube 7 is capable of sliding on the firing sleeve 8 which is mounted in removable manner on the rifle barrel 9 by aid of connection 10.

Packing grooves 11', are provided on the external surface of the firing sleeve 8.

A braking tube 12 is seated at the rear of the grenade and is placed inside the firing sleeve 8 along the axis of the rifle barrel 9. The fastening of the tube 12 to the rear of the grenade is preferably accomplished in such manner that the said tube 12 is detached from the grenade at the moment of firing. For this purpose, in the example of Fig. 1, the tube 12 is fastened by aid of a pin 13 on a lug 14 of the grenade. This lug 14 advantageously comprises a portion 15 which widens out from the rear toward the front in the manner shown. A plastic or yieldable element, preferably formed by a lead washer 16, is interposed between the lug and the tube 12.

The internal surface of the tube 12 has, for all or a part of its length, a lesser diameter than the calibre of the rifle bullet. This diameter diminishes regularly or irregularly from the rear toward the front. Its profile may be cylindrical, stepped as shown, conical, cylindro-conical, threaded or otherwise.

By way of modification, there may be located in this tube a very hard auxiliary ball, of steel, for example, intended to be driven forward by the rifle bullet.

A tail 20, preferably connected on the tube 7, assures the stability of the projectile during flight. This tail may also be formed of an appropriate shaping, undulated, flared, or otherwise at the rear portion of the tube 7.

The front sight 21 of the rifle cooperates with a suitable slot 22 in the firing sleeve 8, (Figs. 1 and 12) to form a bayonet joint, assuring the fixation of the firing sleeve 8 on the barrel 9. A ring 23 forced downward by a spring 24 and retained by a spur 28, is engaged in a longitudinal slot 26 of the firing sleeve 8, and assures the latching of the latter onto the barrel 9, as by turning the sleeve 8 in a suitable direction and pressing the ring 23 against the top of the front sight 21, the latter is locked in a corresponding notch 27 of the ring 23. Any other type of joint may also be well employed for fastening the firing tube 8 on the rifle.

Figure 3:
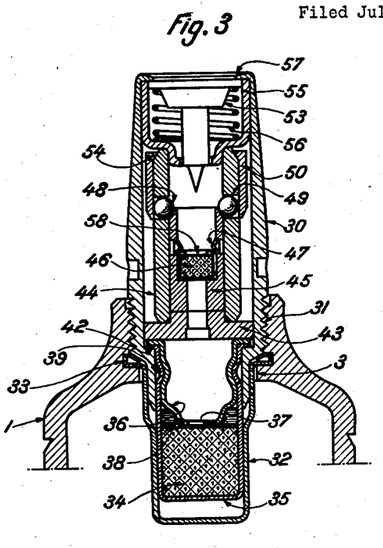
Fig. 3 is an axial section on a larger scale of the forward portion of the grenade, showing the fuse in the position of rest.

The fuse represented in Fig. 3 comprises a nose 30 seated at 31 by screw threads or otherwise in the eye 3 of the grenade 1. In the example illustrated, this fuse holds the detonator holder 32 in a recess 33 provided at the base of the screw threads 31. The detonator 34 is held in place in its cup 35, by a flanged member 36 pierced with an opening 37 covered by a gasket 38. A constriction 39 or other type of fastening serves to rigidly connect the flanged member 36 and the cup 35 which rest against a shoulder 42 of the nose 30.

The assembly is covered by a washer 43 on which is centered a tube 44 in which may slide, with slight friction, a primer holder 45. The primer 46 is held in the primer holder 45 by any suitable fastening device, formed in the illustrated example by a collar 47.

A safety device comprising preferably balls 48 held in latched position in their seats 49 by aid of a ring 50, normally blocks the primer holder 45 at a suitable distance from the firing pin 53 to avoid any risk of percussion in case of a fall or of accidental shock in the course of transport and manipulation. A suitable retaining device such as the crimped end 54 retains the ring 50 and consequently the balls 48 in the latched position.

The firing pin 43 is mounted in such manner as to be able to slide in a perforated cup 55 resting on the tube 44. A spring 56 or other elastic element, interposed between the cup 55 and the firing pin 53, tends to maintain the latter in the position shown in Fig. 3.

An appropriate stop, such as a crimp 57, opposes the departure of the firing pin from its seat and blocks the cup 55 in position.

With a view of increasing further the safety against premature percussion in the course of manipulation prior to firing, the firing pin 53 and the gasket 58 of the primer 46 are constructed and arranged in such manner as to form a "soft point—hard plate" system, as described in French Patent 622,701 dated February 9, 1926.

Figure 7:
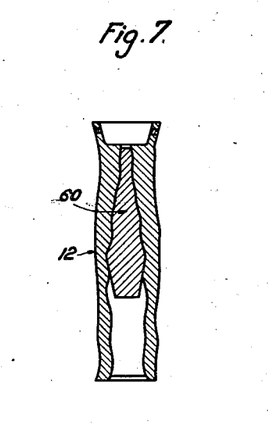
Fig. 7 is a transverse section of the braking tube deformed by the bullet at the moment of firing.

The operation is as follows:

At the moment of firing, the ball 60 becomes seated in the braking tube 12 (Fig. 7) in such manner that its kinetic energy adds its effect to that of the cartridge gases for firing the grenade 1, whose propelling tube 7 (Fig. 1) is guided by the firing sleeve 8, the tightness of the joint being assured by the grooves 11'. At the same time, under the pressure exerted by the ball 60, the tube 12 compresses the plastic washer 16, shears the pin 13, is expanded on the conical portion 15, and is easily detached from the lug 14, the pressure of the gases on the rear of the grenade 1 being much greater than that on the tube 12. Consequently, the tube 12 falls to the ground at the mouth of the firing sleeve 8.

On the other hand, when the grenade is driven forward under the effect of the shock of the ball, the ring 50 (Fig. 4) remains behind because of inertia and overcomes the action of its detent 54 (Fig. 3) and thus liberates the balls 48 which separate and unlatch the primer holder 45.

Figure 4:
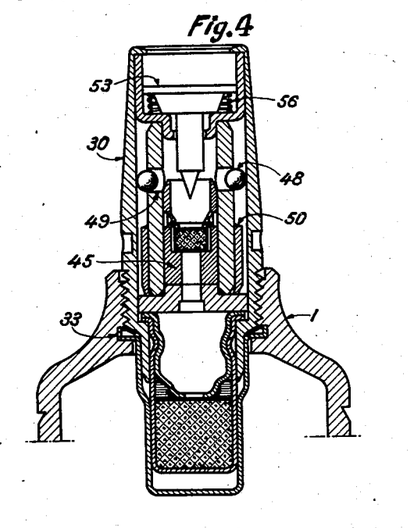
Figs. 4, 5 and 6, are views analogous to those of Fig. 3, showing respectively the positions taken by the elements at the moment of firing, after the cessation of the positive acceleration, and at the impact.

The firing pin 53 also remains behind, likewise because of inertia, by compressing its spring 56 and comes into the position of Fig. 4.

When the positive acceleration has ceased, the spring 56 returns the firing pin 53 into its initial position, (Fig. 5) and the primer holder 45, no longer being retained, is displaced forwardly by its inertia, by reason of the relative braking imparted to the grenade by the resistance of the air. It finally comes into the position of Fig. 5, where it abuts against the cup 55. During the time taken by the primer holder 45 for passing from the position of Fig. 3 to that of Fig. 5, in which percussion is possible, the grenade has traversed a certain trajectory. During this first portion of the trajectory, all risk of premature percussion resulting from the encounter of the projectile with an unexpected obstacle near the grenadier is absolutely eliminated since the spacing of the primer 46 from the firing pin 53 renders percussion impossible. This distance or this time of safety after firing may also be regulated at will by varying the travel of the primer holder 45 and its coefficient of friction in the tube 44. An elastic element of variable force may also be interposed between the primer holder 45 and the washer 43.

Figure 5:
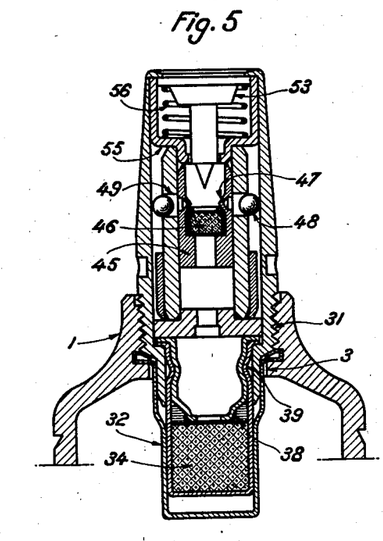
Figure 6:
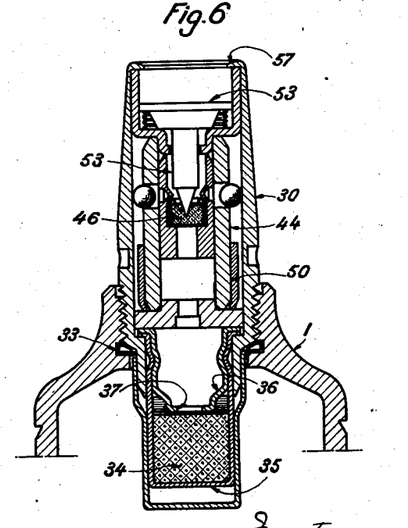

It may be remarked that the dimensions of the elements are chosen in such manner that there exists between the points of the firing pin 53 and the primer 46, in the position of Fig. 5, a sufficient distance for permitting the almost total immobilization of the firing pin before percussion, which is thus effected at impact, with a maximum velocity of shock (Fig. 6). Consequently, the operation is instantaneous and the fuse, being extraordinarily sensitive, operates even at contact with an obstacle of extremely low density: thin soil, mud, sand, the surface of water, etc.

In the modification of Figs. 8 to 11, the primer 46 is held fixed in the tube 44 and the balls 48 are constructed in such a manner as to oppose, in normal times, the driving of the firing pin 53, which in the present example, comprises a cavity 63 with a view of reducing its mass to a minimum and thus further increase the sensitiveness of the fuse.

Figure 8:
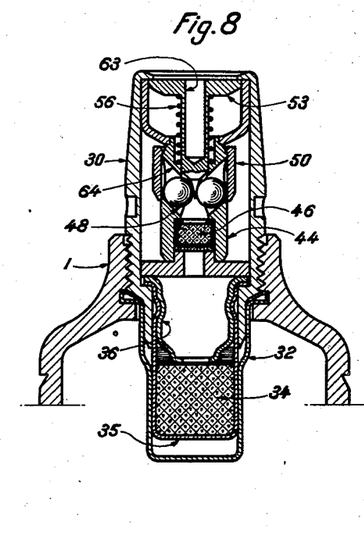
Fig. 8 is an axial section of the front portion of the grenade showing another example of the construction of the fuse.

The axes of the seats 64 of the balls 48 preferably form an acute angle with the forward direction of the axis of the fuse, as illustrated.

Figure 9:
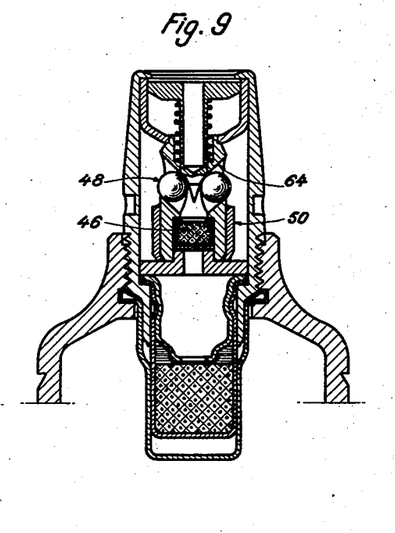
Figs. 9, 10 and 11 are views analogous to those of Fig. 8 and show respectively the positions taken by the elements at the moment of firing, after the cessation of the positive acceleration, and at impact.
Figure 10:
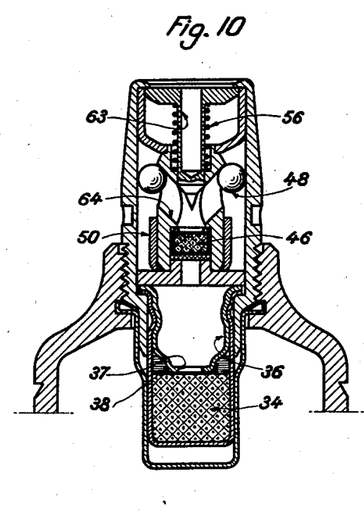
Figure 11:
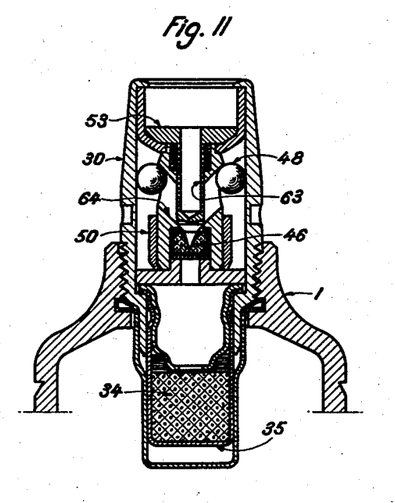

At the moment of firing, the elements assume the position of Fig. 9, the firing pin 53 coming by inertia to bear on the balls 48 which it leaves under the action of its spring, when the positive acceleration has ceased (Fig. 10). Under the effect of air resistance which is exerted on the exterior of the projectile, the balls 48 are advanced by inertia in their seats 64 and unlatch the firing pin 53 which may then, at impact, fire the primer 46 (Fig. 11).

It will be seen that the grenade and the firing sleeve according to this invention, avoiding leakages of gas from the cartridges, permit utilizing their action to a maximum. Thus results a notable increase in the trajectory for a given charge.

The particular arrangement of the firing sleeve 8 (Fig. 1) permits giving it a reduced cross section, which reduces to a minimum the reaction of the gases on the rifle butt. This offers the double advantage of facilitating the firing and of avoiding deterioration of the firearm.

Furthermore, owing to the squatty shape of the firing sleeve 8, its weight is reduced to a minimum and the front sight 21 of the rifle projects over it, which permits of the ordinary fire with ball cartridges even though the firing sleeve is mounted on the firearm, and it thus further constitutes an excellent concealing device for the flash.

The elongated form of the grenade 1 provided with its tailed propelling tube 7, assures the stability of the assembly for its trajectory. Thus there results a remarkable increase in the precision of fire, at the same time as a certain fall onto its head at impact, which permits the employment of a percussion fuse. On the other hand, the firing is no longer accomplished with a "stray" ball, as in certain similar devices at the present time, any risks of accident outside of the zone of fire being thus eliminated.

Figure 12:
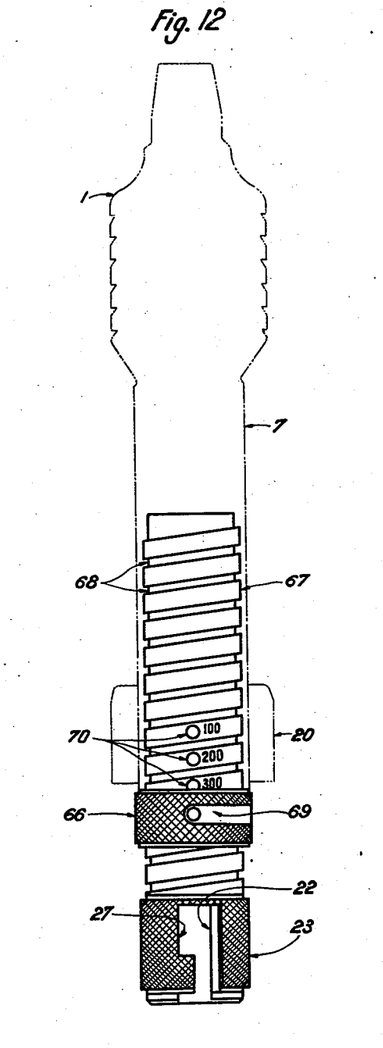
Fig. 12 is an elevation of a different construction of the firing sleeve, the outline of the grenade being shown in dotted lines.

Fig. 12 shows a modification of the firing sleeve 8, in which a ring 66, mounted on the firing sleeve 8, serves for varying the trajectory by modifying the effective length of the sleeve. This ring comprises at its interior a screw thread engaged with a thread on the firing sleeve, whose cavities 68 play the part of packing grooves. A spring stop pawl 69, fixed on the ring 66 and capable of being engaged in notches 70 of the firing sleeve corresponding to the different trajectories, permits regulating the position of the propelling tube 7 conveniently. This element may be formed by any other appropriate stop device.

Figure 13:
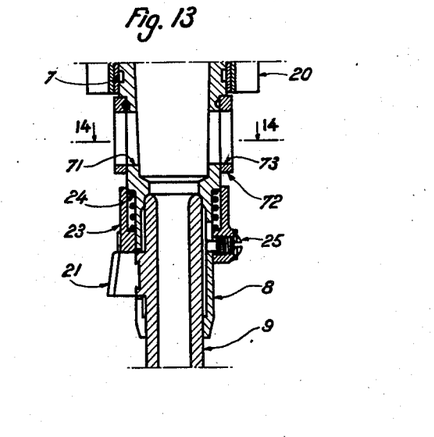
Fig. 13 is a fragmentary axial section of a detail of a modified form of firing sleeve.
Figure 14:
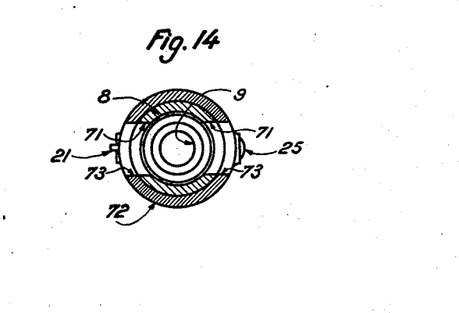
Fig. 14 is a transverse section on line 14—14 of Fig. 13.

Figs. 13 and 14 show a different construction in which there is provided, at the base of the firing sleeve 8, a certain number of perforations 71 capable of being obstructed by aid of a turning ring 72, itself pierced by orifices 73, which serves to regulate the cross section for exhaust or escape offered to the cartridge gases and consequently the trajectory of the projectile.

Figure 15:
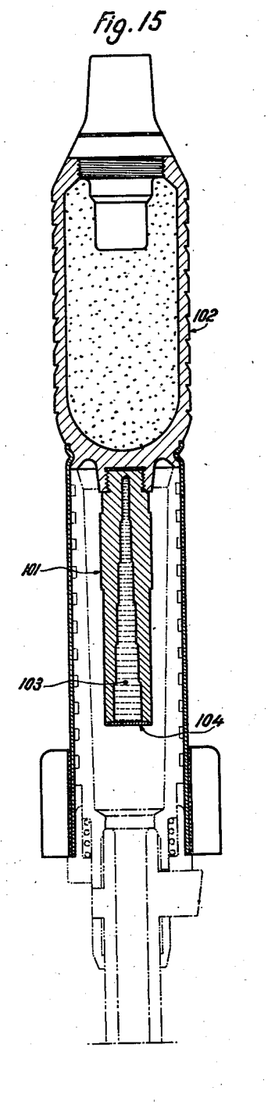
Fig. 15 is an axial section of a modified grenade comprising the improvements which are the objects of this invention, mounted on its firing sleeve, represented in dotted lines.

The braking tube 101 is lodged on the body of the grenade 102 by screw threading or otherwise and may have internally a stepped cylindrical profile, as represented, or may be entirely cylindrical or conical for all or a part of its length, and finally, in a general manner, it may have any appropriate form for the braking of the bullet. It encloses a material which is rather incompressible but is easily displaceable or deformable, such as a liquid 103 or a mixture of more or less viscous liquids or, again, a solid material in finely divided state. Thus rubber, felt, cork, or a material solid at the ordinary temperature and capable of melting under the effect of the heat disengaged by the bullet, such as wax, resin, etc., or indeed combinations of various analogous materials forming damping devices, may also be utilized.

The braking material, when it is not solid, at the ordinary temperature is retained inside the tube 101 by a plate 104 or suitable analogous element seated at the rear of the tube. In case a liquid is employed, care is taken to provide an air bubble inside the tube to permit the expansion of its contents under the effect of variations of temperature. There will be chosen, preferably, a liquid whose freezing point is lower than the lowest temperature to which the tubes may be exposed.

At the moment of firing, the rifle bullet or other projecting device perforates or drives the closing plate 104 and is braked in an extremely energetic manner by the liquid 103 contained in the tubes 101, which can only escape gradually between the bullet and the tube, partly in the state of vapor. The transformation into heat of a part of the kinetic energy of the bullet generally produces, in effect, a partial vaporization of the braking liquid.

In this manner a gradual braking of the bullet and a great flexibility of propulsion of the grenade is attained. Further, the liquid pressed or forced by the bullet transmits pressure in a very uniform manner to the walls of the tube, which consequently are deformed in a very regular manner.

Figure 16:
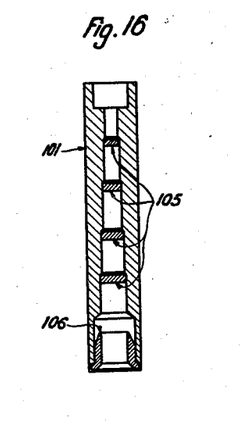
Figs. 16 and 17 are analogous views showing different constructions of the braking tube.
Figure 17:
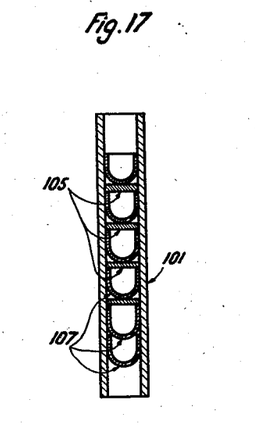

In case that firing takes place by aid of jacketed bullets, i. e., those comprising, for example, a lead core surrounded by a brass jacket, braking tubes of the type represented in Figs. 16 and 17 may advantageously be employed according to this invention.

According to the example of execution of Fig. 16, there is disposed at the interior of the tube 101, a certain number of stop disks 105 formed, preferably, of a resistant material such as steel. These disks which have been, for example, force-fitted in the tube 101 are pushed and forced successively by the bullet. One or more rings 106 are further disposed in the tube in such manner as to leave between their peripheries and the walls of the tube 101, a free space intended to collect the molten lead which thus does not fall into the firing sleeve.

The results sought may also be attained by disposing in the tube one or more flanged elements 107 (Fig. 17) alone or in combination with the disks 105. These various elements further constitute cups for holding the molten lead. It may be remarked further that the heat necessary for the vaporization of the liquid is limited to the variable fraction of kinetic energy of the bullet and further decreases the quantity of heat remaining free for the fusion of the metal.

The greater part of the kinetic energy of the bullet is naturally employed for the propulsion of the grenade for the deformation of the bullet and tube and for the displacement of the liquid.

Figure 18:
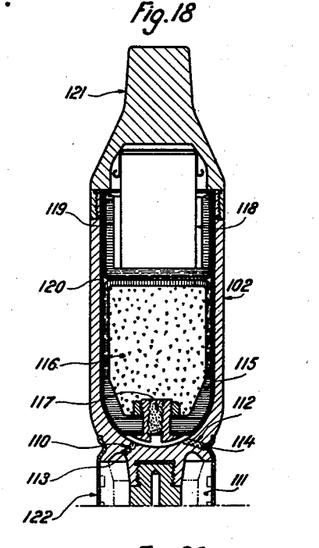
Figs. 18 to 21 are axial sections of grenades according to the invention, adapted respectively to operate as message carrying, smoke bomb, incendiary and signalling projectiles.

Fig. 18 shows an example of the application of the grenade according to the invention as a message carrier. For this purpose, the grenade body 102 is perforated at the rear by a channel 110 opening into the firing sleeve 111 and by a second channel 112 communicating with the exterior. These channels are normally closed by aid of appropriate means such as the wax plugs 113 and 114. At the interior of the grenade 102 is disposed a receptacle 115 enclosing a smoke charge 116, capable of being lighted by means of a delay fuse composition 117, related to the channels 110 and 112. Above the receptacle 115 is disposed the message carrying pocket 118 which rests, preferably, in a protecting cup 119. A suitable device such as a gasket 120 serves to connect the two elements together, with the exclusion of the pocket 118 which is simply retained in place by the cover 121, passing by screw threading or otherwise on the grenade 102.

The operation is as follows: at the moment of firing the propelling gases melt the plugs 113 and 114 and ignite the delay fuse 117 which, in its turn, sets fire to the charge 116 at the end of a predetermined time. The channel 112 opposes any injurious overpressure on the delay fuse 117. The smoke producing composition burns and the smoke escapes through the channels 110 and 112, while the propelling tube 122 forms a chimney. The smoke which is evolved permits following the projectile and indicates its point of fall. It is sufficient to uncover the screw 121 to withdraw the message carrying pocket 118.

Figure 19:
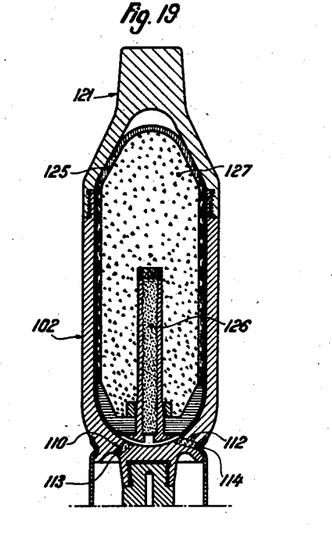

Fig. 19 shows a modification of construction of the grenade, applied to the firing of a smoke producing charge enclosed in a cartridge 125 which may be introduced into the grenade 102 after removing the cover 121. A delay fuse 126, of length which may be adjusted at will, permits effecting the ignition of the smoke producing composition 127 at the desired moment.

Figure 20:
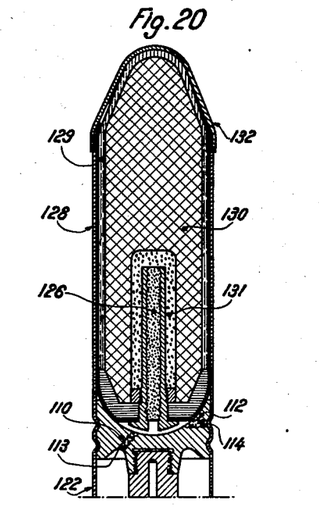

In the example of Fig. 20, the grenade is more particularly adapted to utilization as an incendiary projectile. The lateral portion of the body of the grenade is simply formed by an extension 128 of the firing sleeve 122, inside which is disposed a cartridge 129 enclosing the incendiary material 130, ignited by aid of a suitable composition 131, which itself is ignited by the delay fuse 126. A cover 132, of proper aerodynamic form, closes the front of the grenade.

Figure 21:
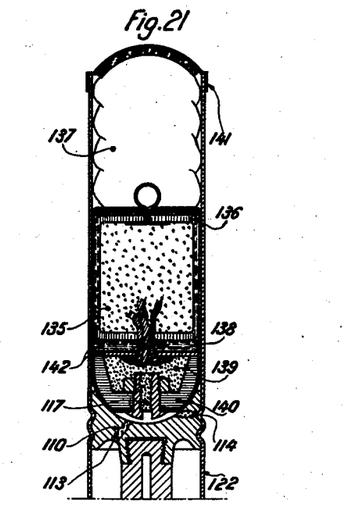

Fig. 21 shows an analogous example of construction, being applied to an illumination or signalling projectile. The illuminating charge 135 is enclosed in a suitable receptacle 136 connected to a parachute 137.

A match 138 permits the ignition of the charge 135 by the starting charge 139 resting in the delay fuse holder 140. A cover 141, fastened by soldering or otherwise, closes the front of the grenade. One or more washers 142, of asbestos for example, are preferably inserted between the charge 139 and the receptacle 136 to avoid any premature deterioration of the latter.

At the moment of firing the delay fuse 117 is ignited by the propelling gases and causes, at the end of a predetermined time, the ignition of the starting charge 139 which expels the receptacle 136 and the parachute 137, by blowing off the cover 141. The charge 135 is ignited by the charge 139 and suspended from the parachute 137 and produces the desired illumination or signal.

The disposition adopted for the message carrying grenades, the smoke producing and possibly for the incendiary grenade, permits giving them the same weight and the same external profile as ordinary grenades and consequently of firing them with the same precision and utilizing the same firing tables.

Naturally the invention is not limited to the forms of construction represented and described which have only been chosen by way of example.

I claim:-

1. A grenade of the class described comprising a grenade body, means for releasably attaching the same to the projective weapon, and an element located in the path of the projectile from said weapon whereby to absorb for the propulsion of the grenade the kinetic energy of the projectile, said element comprising a braking tube, and a material in said tube which is substantially incompressible, but easily displaceable or deformable upon the impact of the projectile thereon.

2. A grenade of the class described, comprising a grenade body, means for releasably attaching the same to the projective weapon, and an element located in the path of the projectile from said weapon whereby to absorb for the propulsion of the grenade the kinetic energy of the projectile, said element comprising a braking tube, a liquid material in said tube, and means for preventing escape of said liquid, said means being located opposite the bore of the projective weapon for perforation by the projectile upon discharge.

3. A grenade of the class described comprising a grenade body, means for releasably attaching the same to the projective weapon, and an element located in the path of the projectile from said weapon whereby to absorb for the propulsion of the grenade the kinetic energy of the projectile, said element comprising a braking tube, and a material therein which is solid at the ordinary temperature but is liquefied under the effect of the heat disengaged by the projectile in entering said tube.

4. A grenade of the class described comprising a grenade body, means for releasably attaching the same to the projective weapon, and an element located in the path of the projectile from said weapon whereby to absorb for the propulsion of the grenade the kinetic energy of the projectile, said element comprising a braking tube and braking elements located inside the tube to be successively encountered and moved forward by the projectile whereby to assure a progressive transmission of the kinetic energy of the projectile to the grenade.

5. A grenade of the class described comprising a grenade body, means for releasably attaching the same to the projective weapon, and an element located in the path of the projectile from said weapon whereby to absorb for the propulsion of the grenade the kinetic energy of the projectile, said element comprising a braking tube and a plurality of braking elements located inside the tube to be successively encountered by the projectile upon discharge, whereby to assure a progressive transmission of the kinetic energy of the projectile to the grenade, at least one of said elements including a portion for collecting and retaining fused material from the projectile.

6. A grenade of the class described, comprising a grenade body, means for releasably attaching the same to the projective weapon, and an element located in the path of the projectile from said weapon whereby to absorb for the propulsion of the grenade the kinetic energy of the projectile, said element comprising a braking tube secured to the base of the grenade and released therefrom by the impact of the projectile.

7. A grenade of the class described, comprising a grenade body, means for releasably attaching the same to the projective weapon, and an element located in the path of the projectile from said weapon whereby to absorb for the propulsion of the grenade the kinetic energy of the projectile, said element comprising a braking tube and a plug of hard material located in said tube to be encountered by the projectile upon discharge and to be driven along the length of said tube.

8. A grenade of the class described comprising a grenade body, means for releasably attaching the same to the projective weapon, an element located in the path of the projectile from said weapon whereby to absorb for the propulsion of the grenade the kinetic energy of the projectile, said element comprising a braking tube mounted at the rear of the grenade body and having for at least a part of its length a diameter less than the calibre of the projectile from the projective weapon and decreasing in cross-section from the rear toward the front, and a propelling tube surrounding said braking tube for cooperation with a firing sleeve attached to the barrel of the propulsive weapon, said firing sleeve having an internal diameter greater than the external diameter of the braking tube and leaving free space for the braking tube to swell under the action of the projectile therein.

9. A grenade of the class described comprising a grenade body, means for releasably attaching the same to the projective weapon, an element located in the path of the projectile from said weapon whereby to absorb for the propulsion of the grenade the kinetic energy of the projectile, said element comprising a braking tube mounted at the rear of the grenade body and having for at least a part of its length a diameter less than the calibre of the projectile from the projective weapon and decreasing in cross-section from the rear toward the front, and a propelling tube surrounding said braking tube for cooperation with a firing sleeve attached to the barrel of the propulsive weapon, said propelling tube being secured to the base of the grenade and having a stabilizing tail at its rearward end.

10. A grenade of the class described for discharge from a firearm having a firing sleeve attached thereto of internal diameter greater than the bore of the firearm, comprising a grenade body and a braking tube of external diameter less than the internal diameter of the firing sleeve secured to the rear of said grenade body to extend into the firing sleeve, a propulsion tube secured to the grenade body and concentrically surrounding said braking tube and having a smooth interior surface to fit over the firing sleeve for holding the braking tube in alinement with the bore of said firearm, said firing sleeve having thereon a trajectory-determining member adjustable axially on the sleeve and serving as a stop in cooperation with said propulsion tube to determine the distance of insertion of said braking tube into the firing sleeve.

11. A grenade of the class described comprising a grenade body, means for releasably attaching the same to the projective weapon, an element located in the path of the projectile from said weapon whereby to absorb for the projulsion of the grenade the kinetic energy of the projectile, and means for attaching said element to the grenade body including a device released upon the impact of the projectile upon said element, whereby the element is severed from the grenade body and, upon the acceleration of the grenade body by powder gases from the projective weapon, the said element is left behind by said grenade body.

12. A grenade of the class described, comprising a grenade body, a braking tube located wholly outside said body and secured to the base of the grenade and adapted to absorb the kinetic energy of the projectile for the propulsion of the grenade and to be released from the grenade upon the impact of the projectile, said braking tube having for at least a part of its length an internal diameter less than the caliber of the projectile from the projective weapon and decreasing in internal cross-section from the rear toward the front, and means for releasably supporting said body and tube upon the projective weapon with said tube in alignment with the bore of said weapon and spaced therefrom.

13. A grenade of the class described, comprising a grenade body, a braking tube located wholly outside said body and secured to the base of the grenade and adapted to absorb the kinetic energy of the projectile for the propulsion of the grenade and to be released from the grenade upon the impact of the projectile, said braking tube having for at least a part of its length an internal diameter less than the caliber of the projectile from the projective weapon and decreasing stepwise in internal cross-section from the rear toward the front, and means for releasably supporting said body and tube upon the projective weapon with said tube in alignment with the bore of said weapon and spaced therefrom.

In testimony whereof, I affix my signature.

EDGAR WILLIAM BRANDT.